United States Patent Office 3,178,374
Patented Apr. 13, 1965

3,178,374
NEW POLYMERS FROM THE PYROLYSIS OF POLYMETHYL AROMATIC HYDROCARBONS
Michael Mojzesz Szwarc, Syracuse, N.Y., assignor, by mesne assignments, to Pullman Incorporated, a corporation of Delaware
No Drawing. Filed Aug. 28, 1952, Ser. No. 306,940
18 Claims. (Cl. 260—2)

The invention of this application, which is a continuation-in-part of application Serial No. 48,339 filed on September 8, 1948, relates to new and useful polymers and processes for the production thereof.

The invention consists in a process for the production of a solid polymer which comprises pyrolyzing the vapor of an aromatic hydrocarbon selected from polymethyl benzenes and polymethyl naphthalenes having from two to six methyl groups substituted in the nucleus with two of the said methyl groups in the para positions of one ring, by subjecting the vapor under subatmospheric pressure to a temperature of from 700 to 1000° C. for a period of not more than 10 seconds and cooling the resulting vapors to a temperature at which a solid polymer is deposited.

The invention also consists in the polymers produced by the process of the invention.

The starting materials which may be used for the production of the polymers of the invention are 1,4-dimethyl naphthalene, p-xylene, pseudocumene, durene, isodurene, prehnitene, pentamethyl benzene and hexamethyl benzene.

The preferred starting materials are p-xylene, pseudocumene, durene and isodurene.

The polymers produced by the invention have valuable properties in that they have good electrical insulating properties, relatively high thermal stabilities, do not dissolve in the usual organic solvents at normal temperature and are resistant to concentrated mineral acids at normal temperatures. Thus they may be used for purposes where these properties are required.

There are variations in the properties of the individual polymers which are set out more fully below.

The contact times most suitable for use in the pyrolysis step of the process of the invention depend largely on the temperature at which the pyrolysis is carried out. It has been found that the higher the temperature is, the shorter is the contact time required to obtain optimum conversions and to reduce the loss of starting material not converted to the solid polymer.

The preferred temperature range is from 800 to 1000° C. and still more preferably from 850 to 1000° C. The contact time should preferably not exceed 1 second and within the range of 850 to 1000° C. may suitably be from 0.5 to 0.02 second.

The most satisfactory results are obtained when the pyrolysis is carried out at sub-atmospheric pressures and preferably at partial pressures in the region of 10 mms. Hg absolute pressure and below. The pyrolysis may be carried out in the presence of an inert gas such as carbon dioxide or nitrogen, in which case the partial pressure exerted by the hydrocarbon vapor should preferably be in the region of 10 mms. Hg absolute pressure and below. When an inert gas is present it is desirable that the total vapor pressure should not exceed 200 mms. Hg absolute pressure, and it may suitably be between 100 and 200 mms. Hg absolute pressure.

The polymers or polymeric products of the invention are formed spontaneously on cooling the pyrolyzed vapors. The temperature to which the vapors should be cooled for condensation and polymerization to take place can easily be determined by experiment.

It depends on the partial pressure of the monomer vapor in the gas phase and increases with increasing partial vapor pressure. Cooling to from 0 to 50° C., and preferably to room temperature, will, however, be generally found most satisfactory for this purpose in the processes of the invention.

The polymers may be recovered in film form by cooling in contact with a cold surface and may be washed with benzene, ether or other suitable solvent to remove condensed starting material or other soluble material present.

The monomeric units of the polymers of the invention are the radicals formed from the starting materials by the splitting off during the pyrolysis of two hydrogen atoms, one from each of the two methyl groups in the para positions.

Experiments which have been carried out by reacting the pyrolyzed vapors of p-xylene with iodine vapor have resulted in the production of p-xylene di-iodide $$(CH_2I.C_6H_4.CH_2I)$$

This shows that the 1,4-dimethylene benzene radical $(CH_2.C_6H_4.CH_2)$ exists in the vapor phase in the pyrolyzed vapors. On cooling and condensing of the vapors spontaneous polymerization takes place to give the polymer of this radical. The ratio of carbon to hydrogen in the polymer as determined by analysis confirms that the polymer is built up of monomeric units consisting of the 1,4-dimethylene benzene radical.

Similarly the monomeric units of the polymers obtained from 1,4-dimethyl naphthalene, pseudocumene, durene, and isodurene are established as the radicals 1,4-dimethylene naphthalene,
1,4-dimethylene-2-methyl benzene,
1,4-dimethylene-2,5-dimethyl benzene, and
2,5-dimethylene-1,3-dimethyl benzene, respectively.

X-ray examinations carried out on the polymers of the invention have shown them to have a crystalline structure.

The invention is illustrated by the following examples. All pressures quoted are absolute pressures.

EXAMPLE 1 p-Xylene vapor at a pressure of 8 to 10 mms. Hg was passed through a tube heated to 860° C. at such a rate that the vapor was subjected to this temperature for from 0.3 to 0.4 second. The vapors leaving the tube were passed into a trap in which they were cooled to 0° C. in contact with a cold surface on which the polymerized product was deposited in the form of a white occasionally transparent film.

The yield of polymer was approximately 12% by weight of the p-xylene treated. Unconverted p-xylene was also condensed in the trap.

EXAMPLE 2

Carbon-dioxide at atmospheric pressure was bubbled through liquid p-xylene maintained at 100° C. to take up p-xylene vapor so that the partial pressure of the latter in the mixture was about 100 mms. Hg. The mixture of carbon-dioxide and vapor was then passed at a total pressure of about 100 mms. Hg through a tube heated to 800° C. at such a rate that it was subjected to this temperature for 1 second. The gaseous mixture leaving the tube was cooled to room temperature in a trap in which the polymer was deposited in the form of a white occasionally transparent film.

EXAMPLE 3 p-Xylene vapor at a pressure of 1.5 mms. Hg was passed through a silica tube heated to 920° C. at such a rate that the vapor was subjected to this temperature

3 for about 0.1 second. The vapors leaving the tube were cooled to room temperature and the polymerized product was deposited.

The polymer was in the form of a film similar to that obtained in Example 1.

EXAMPLE 4

Pseudocumene vapor at a pressure of 2 mms. Hg was passed through a silica tube heated to 850° C. at such a rate that the vapor was subjected to this temperature for 0.12 second. The vapor leaving the tube was passed into a trap in which it was cooled to approximately 18° C. in contact with a cold surface on which a polymeric product was deposited in the form of a yellowish coherent film. Pseudocumene was also condensed in the trap. The yellow film was washed with ether to remove any condensed soluble material.

EXAMPLE 5

Pseudocumene vapor at a pressure of 2 mms. Hg was passed through a silica tube heated to 900° C. at such a rate that the vapor was subjected to this temperature for 0.04 second. The vapor leaving the tube was cooled as in Example 4 to approximately 18° C. A polymeric product in the form of a yellowish film was obtained, which was washed with ether to remove any condensed soluble material.

The polymeric products obtained in Examples 4 and 5 were flexible and on molding at a temperature of about 300° C. and under moderate pressure yielded a tough flexible product. This product had good electrical insulating properties and was capable of withstanding temperatures up to at least 200° C.

EXAMPLE 6

Durene vapor at a pressure of 2 mms. Hg was passed through a silica tube heated to 845° C. at such a rate that the vapor was subjected to this temperature for 0.21 second. The vapor leaving the tube was cooled as in Example 4, to yield a polymeric product which was washed with benzene to remove any condensed soluble material. The polymeric product was recovered as an opaque white film, which was tough and flexible.

The polymeric product was satisfactorily molded at about 320° C. and under pressure. The molding was, however, more brittle than those obtained in the previous examples.

EXAMPLE 7

Example 6 was repeated with isodurene under the same temperature and pressure conditions but with a contact time for the pyrolysis of 0.05 second. The resultant polymer was satisfactorily molded at about 300° C. and under pressure to yield a very flexible product.

EXAMPLE 8

The vapors of a mixture of o- and p-xylenes containing 55% by weight of the latter was passed through a silica tube heated to 900° C. The contact time was 0.17 second and the pressure was 4.5 mms. Hg. The vapor leaving the tube was cooled to room temperature and the film which was deposited was washed with benzene. The product has a similar appearance and properties to that obtained in Example 1.

As has been previously indicated there is a variation in the properties of the products produced by the process of the invention from different starting materials.

Thus whereas the polymeric products from p-xylene, 1,4-dimethyl naphthalene and durene will only dissolve at temperatures above 300° C. in aromatic solvents boiling above this temperature, the products from pseudocumene and isodurene will dissolve at temperatures above 200° C. in aromatic solvents boiling above 200° C.

All these products will resist attack by cold concentrated hydrochloric, nitric or sulphuric acid and by hot concentrated hydrochloric acid. However the products from pseudocumene, durene and isodurene are attacked by concentrated nitric and sulphuric acids. Those from p-xylene and 1,4-dimethyl naphthalene are attacked only slowly by hot concentrated sulphuric acid.

The softening points of the various products also vary. Thus the products from p-xylene, 1,4-dimethyl naphthalene and durene do not soften to any noticeable extent below 300° C. The pseudocumene product does not soften below 250° C. but softens at about 280° C. and the isodurene product does not soften below 200° C. but softens at about 240° C.

The products from pseudocumene and isodurene can be molded at a temperature of 300 to 320° C. under a pressure of ½ ton/sq. inch to give flexible products.

The product from durene can also be molded to give a tough, inflexible product but the product from p-xylene is difficult to mold and yields a brittle product. The p-xylene product may, however, be suitably used in comminuted form as filler for compositions in which its properties are valuable and may also be directly deposited on formation as a coating in film form.

The following table sets out the melting points and comparative cloud points in aromatic solvent 365 of various polymers of the invention. Melting takes place with apparent decomposition. The aromatic solvent 365 employed was an aromatic cut boiling between 360 and 500° C. obtained from the liquid products resulting from the Catarole petroleum, cracking and aromatization process.

*Table*

| Starting Material for Polymer | Melting Point, ° C. | Cloud Point, ° C. |
| --- | --- | --- |
| p-Xylene | 420–430 | 250 |
| Pseudocumene | 350–360 | 110 |
| Durene | | 200 |
| Isodurene | 200 | 80 |

It will be seen from Example 8 that mixtures of xylenes containing p-xylene may be used to provide the p-xylene vapor for pyrolysis in the process of the invention. When such mixtures are used they should contain at least 50% by weight of p-xylene. The mixtures may contain both o- and m-xylene.

I claim:

1. A process for the production of a solid polymer which comprises pyrolyzing the vapor of an aromatic hydrocarbon selected from the class consisting of polymethyl benzenes and polymethyl naphthalenes having from two to six methyl groups substituted in the nucleus with two of the said methyl groups in the 1,4- positions of one ring, by subjecting the vapor under subatmospheric pressure to a temperature of from 700 to 1000° C. for a period of not more than 1 second and cooling the resulting vapors to a temperature at which a solid polymer is deposited.

2. A process as claimed in claim 1 in which said temperature is from 800 to 1000° C., and said pressure is not in excess of 200 mms. Hg absolute pressure.

3. A process for the production of a solid polymer which comprises pyrolyzing the vapor of 1,4-dimethyl naphthalene by subjecting the vapor under a total pressure not in excess of 200 mms. Hg absolute pressure to a temperature of from 800 to 1000° C. for a period of not more than 1 second and cooling the resulting vapors to a temperature at which a solid polymer is deposited.

4. A process for the production of a solid polymer which comprises pyrolyzing the vapor of a polymethyl benzene having from three to four methyl groups substituted in the nucleus with two of the said methyl groups in the para positions, by subjecting the vapor under a total pressure not in excess of 200 mms. Hg absolute pressure to a temperature of from 800 to 1000° C. for a period of not more than 1 second and cooling the resulting vapors to a temperature at which a solid polymer is deposited.

5. The process of claim 3 in which said resulting vapors are cooled to a temperature of below 50° C. for the deposition of a solid polymer.

6. The process of claim 3 in which the pyrolysis is carried out with the said vapor diluted with an inert gas.

7. The process of claim 4 in which said resulting vapors are cooled to a temperature of below 50° C. for the deposition of a solid polymer.

8. The process of claim 4 in which the pyrolysis is carried out with the said vapor diluted with an inert gas.

9. A process for the production of a solid polymer which comprises pyrolyzing the vapor of p-xylene by subjecting the vapor exerting a partial pressure not in excess of 10 mm. Hg absolute pressure to a temperature between 800 and 1000° C. for a period of not more than 1 second and cooling the resulting vapors to a temperature below 50° C. at which a solid polymer is deposited.

10. A process for the production of a solid polymer which comprises pyrolyzing the vapor of pseudocumene by subjecting the vapor exerting a partial pressure not in excess of 10 mm. Hg absolute pressure to a temperature between 800 and 1000° C. for a period of not more than 1 second and cooling the resulting vapors to a temperature below 50° C. at which a solid polymer is deposited.

11. A process for the production of a solid polymer which comprises pyrolyzing the vapor of isodurene by subjecting the vapor exerting a partial pressure not in excess of 10 mm. Hg absolute pressure to a temperature between 800 and 1000° C. for a period of not more than 1 second and cooling the resulting vapors to a temperature below 50° C. at which a solid polymer is deposited.

12. A process for the production of a solid polymer which comprises pyrolyzing the vapor of durene by subjecting the vapor exerting a partial pressure not in excess of 10 mm. Hg absolute pressure to a temperature between 800 and 1000° C. for a period of not more than 1 second and cooling the resulting vapors to a temperature below 50° C. at which a solid polymer is deposited.

13. A process for the production of a solid polymer which comprises pyrolyzing the vapor of 1,4-dimethyl naphthalene by subjecting the vapor exerting a partial pressure not in excess of 10 mm. Hg absolute pressure to a temperature between 800 and 1000° C. for a period of not more than 1 second and cooling the resulting vapors to a temperature below 50° C. at which a solid polymer is deposited.

14. The process of claim 9, in which the mixed vapors obtained from a mixture of xylenes containing at least 50% by weight of p-xylene is subjected to the temperature of pyrolysis.

15. As a new product, the solid polymerization product of the pyrolyzed vapors of a polymethyl benzene having from 3 to 4 methyl groups substituted in the nucleus with two of the said methyl groups being in the para positions; said polymerization product having as its recurring unit the 1,4-dimethylene radicals of said polymethyl benzene, having a crystal structure, having a softening point above 200° C. and being insoluble in many organic solvents at ordinary temperatures.

16. As a new product, the solid polymerization product of the pyrolyzed vapors of pseudocumene; said polymerization product having as its recurring unit the 1,4-dimethylene-2-methyl benzene radical, having a crystal structure, having a softening point above 250° C. and being insoluble in many organic solvents at ordinary temperatures.

17. As a new product, the solid polymerization product of the pyrolyzed vapors of durene; said polymerization product having as its recurring unit the 1,4-dimethylene-2,5-dimethyl benzene radical, having a crystal structure, having a softening point above 300° C. and being insoluble in many organic solvents at ordinary temperatures.

18. As a new product, the solid polymerization product of the pyrolyzed vapors of isodurene; said polymerization product having as its recurring unit the 2,5-dimethylene-1,3-dimethyl benzene radical, having a crystal structure, having a softening point above 200° C. and being insoluble in many organic solvents at ordinary temperatures.

References Cited in the file of this patent

UNITED STATES PATENTS

| | | |
|---|---|---|
| 1,875,317 | Carothers | Sept. 6, 1932 |
| 2,143,509 | Conover | Jan. 10, 1939 |
| 2,524,318 | Kharasch | Oct. 3, 1950 |

FOREIGN PATENTS

| | | |
|---|---|---|
| 650,947 | Great Britain | Mar. 7, 1951 |